Patented Aug. 2, 1938

2,125,401

UNITED STATES PATENT OFFICE 2,125,401

PROCESS OF REACTING ALKALI METALS WITH AROMATIC HYDROCARBONS

Norman D. Scott, Sanborn, N. Y., assignor to E. I. du Pont de Nemours & Company, Wilmington, Del., a corporation of Delaware No Drawing. Application November 13, 1935, Serial No. 49,556

12 Claims. (Cl. 260—168)

This invention relates to improvements in the method of effecting the reaction of alkali metals with aromatic hydrocarbons. This application is a continuation in part of my copending application Serial No. 638,524 issued January 7, 1936 as U. S. Patent 2,027,000.

It is well known that alkali metals will react with a wide variety of aromatic hydrocarbons under a wide variety of conditions. An extensive review of this work has recently been published by C. B. Wooster, (Chemical Reviews XI 1 Aug. 1932). While most of the reactions described are at present of little technical significance on account of the cost of the materials involved, there is particular interest in the attempts that have been made to react alkali metals with the cheaper hydrocarbons such as naphthalene and diphenyl. Schlenk (Annalen 463 90–95) carried out slow reactions using lithium in ethyl ether and obtained sufficient reaction in eight days with naphthalene, and in fourteen days with diphenyl, to permit some examination of the products formed. He represented the alkali metal compounds by the formulæ,

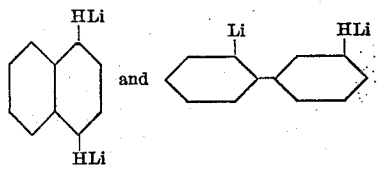

Schlenk, using ethyl ether as solvent, failed to get any appreciable reaction of sodium with these hydrocarbons even in months. He attributed this to a poisoning effect on the sodium of minute traces of sulfur compounds present even in the best grades of naphthalene as supplied for a standard for calorimetry.

The reaction of sodium with naphthalene has also been studied to some extent using liquid ammonia as solvent. At ordinary temperatures, the reaction products are sodamide and tetralin. At low temperatures a red solution is obtained which has been shown by Wooster, (J. A. C. S. 53 179–187 1931), to be in all probability a monosodium tetralin formed by addition of four atoms of sodium to one molecule of naphthalene, followed by immediate ammonolysis of three atoms of the sodium to sodamide as represented by the equations:

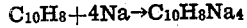
$$C_{10}H_8 + 4Na \rightarrow C_{10}H_8Na_4$$

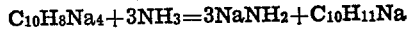
$$C_{10}H_8Na_4 + 3NH_3 = 3NaNH_2 + C_{10}H_{11}Na$$

Because of the large consumption of sodium and the reactivity of the ammonia used as solvent, this method is practically useless as a means of preparing acids or other derivatives from naphthalene.

One object of this invention is to improve the rate of known reactions of alkali metals with various classes of aromatic hydrocarbons. Another object is to cause the reactions to be carried out at low or moderate temperatures and conditions favorable to the stability of the products. Another object is to permit the reaction of relatively cheap and available materials to give valuable products not previously obtainable. Other objects will appear from the description of the invention.

I have found that certain solvents and classes of solvents have a very specific action in promoting the reaction of alkali metals with aromatic hydrocarbons such as naphthalene, diphenyl, phenanthrene or anthracene and others which will form addition products with alkali metals. As stated, the action of these solvents is specific, but I do not know whether their action is catalytic, whether the solvent itself takes part in the reaction in some manner, or whether there are some solubility or other physical factors involved. These solvents permit or enhance the reaction of sodium with aromatic hydrocarbons, which reactions either occur exceedingly slowly in other solutions or do not occur at all.

The solvents which I have found of such remarkable activity and usefulness for these reactions are broadly in the class of ethers although all of the ethers are not effective, and of the effective ones, some are better than others. Thus, although only a few mono ethers are satisfactory as described and claimed in my co-pending application, Serial No. 638,524, issued January 7, 1936 as U. S. Patent 2,027,000 I have used satisfactorily aliphatic poly ethers of all types. By poly ethers in this case I mean the fully alkylated products of polyhydric alcohols such as the glycols and glycerols and including the ethers from the hypothetical polyhydric alcohols such as methylene glycol or others with more than one hydroxyl group on the same carbon atom, e. g. ethyl ortho formate, methylal or other acetals. Thus I have used successfully methylal; ethylene glycol diethers such as the methyl methyl, methyl ethyl, ethyl ethyl, methyl butyl, ethyl butyl, butyl butyl, butyl lauryl; trimethylene glycol dimethyl ether; glycerol trimethyl ether; glycerol dimethyl ethyl ether; methyl ortho formate; ethyl ortho formate; diethylene glycol methyl ethyl ether; formal of the monomethyl ether of ethylene glycol; cyclic ethers such as dioxane, glycol formal, methyl glycerol formal; dimethylene pentaerythrite; and the like. In the case of ethers of the poly alcohols such as the glycerols they may have the O on adjacent C atoms as in ethylene glycol or 1,2 propylene glycol or they may be separated as in 1,3 propylene glycol.

The chief requirement of these poly ethers is that they must not react with the alkali metal or the alkali metal addition compounds under the conditions used. I do not mean by this that the ethers may not react in some way in some reversible reaction with the alkali metal and/or naphthalene since indications are that the ethers in effecting the reactions may to some extent take part in the reaction, but the ether must not be broken up or form irreversible reaction products at a rate comparable with the desired reactions. A slight irreversible reaction may take place without a substantial loss. In order to simplify the wording later, I further specify such ethers as are effective within my invention as being "inert", although as noted they may play some active role in causing the reactions to proceed, or may undergo decomposition reactions at rates very slow in comparison with the desired addition reactions.

I have found that inert non-ether types of solvents such as hydrocarbons or alkyl sulfides which do not react with the alkali metals and which in themselves are non-effective for the reactions may be used as diluting agents for the effective aliphatic poly ethers. There is, however, a minimum concentration of the effective ether in the non-effective solvents beyond which the reaction will not proceed. Thus, in general the effective dimethyl ethylene glycol ether can be diluted with a non-reactive, non-effective hydrocarbon up to 4 or 5 times its volume. If the dilution be as high as 6 or 8 times the volume of the active ether the reaction will not proceed. With the higher mono ethers, which are non-effective or relatively non-effective in themselves, the dilution may be greater.

As noted above, various aromatic hydrocarbons have been tried, and it was found that these effective ethers enhanced the alkali metal reactions. For further description, the invention will be illustrated particularly with respect to the reaction of naphthalene with sodium, but it is to be understood that what is said thereon will apply equally well to the reaction of the other alkali metals and to any of the polycyclic aromatic hydrocarbons capable of forming addition compounds with alkali metal. Examples of polycyclic aromatic hydrocarbons other than naphthalene which may be reacted with alkali metal in accordance with the present invention are diphenyl, dinaphthyl, phenanthrene, acenaphthene, anthracene and retene, as well as homologs (e. g. alkyl derivatives) of these hydrocarbons. The various poly ethers hereinafter mentioned are effective solvents for the reaction of these hydrocarbons with alkali metals.

I have found that sodium reacts very readily with naphthalene in dimethyl ethylene glycol ether solution even at −70° C. Naphthalene also reacts readily with sodium using methyl ethyl glycol ether as solvent. Other mixed poly ethers with higher primary alkyl groups can also be used, as listed above. Similar results are obtained when other polycyclic aromatic hydrocarbons, e. g., diphenyl, phenanthrene, acenaphthene or anthracene are used in place of naphthalene.

It is to be understood also that this invention includes the use as solvent, not only of the "effective" solvents as defined and illustrated, but also of mixtures of these solvents with other solvents which may include the less active higher mono ethers, and also hydrocarbons. Considerably greater dilution with inert solvents is permissible after the reaction is definitely started.

I have further discovered that a solution of naphthalene in an "effective" poly ether will readily dissolve sodium in an amount equivalent to one gram atom of sodium for each gram molecule of naphthalene; thereafter the solution of further amounts of sodium becomes so slow as to be negligible. This is somewhat unexpected since the reaction products obtained by further treatment of the sodium-naphthalene compound, for example, with water or $CO_2$ indicate that it is in large part the 1:4 disodium naphthalene:

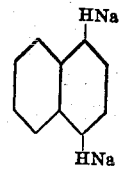

It is probable that this is an equilibrium reaction. It is also found that other isomeric disodium addition compounds are formed as evidenced by the formation of isomeric acids.

In view of the fact that the solution which is thus prepared, and contains one gram atom of sodium for each gram molecule of naphthalene, is a highly colored green solution and readily conducts an electric current, it is possible that the compound may exist in solution as a free radical which may be represented by the formula:

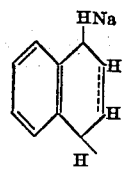

The soluble addition compound may involve the combination of disodium naphthalene with an extra molecule of naphthalene in some other manner. Thus its formula could be written:

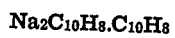

without specifying the exact method of combination. Moreover this soluble addition product may conceivably also include some combination with the ether solvent to account for the specific action of the effective aliphatic poly ethers. The reactions of this material, however, are clearly evident and I do not desire to be limited by any hypothesis as to the probable structure in solution.

If such a solution which contains sodium equivalent to one gram atom of sodium for each gram molecule of naphthalene be treated with water or alcohol, it will yield equivalent amounts of naphthalene and dihydronaphthalene; with $CO_2$ it will yield the sodium salts of dihydronaphthalene-dicarboxy acids, along with an equivalent amount of naphthalene. If, however, either the hydrolysis or the carboxylation is carried out gradually while further amounts of sodium are present in the liquid, further amounts of this sodium will dissolve as that in the solution is used by the hydrolysis or carboxylation. In this manner I have been able to react essentially all of the naphthalene and recover the major amount as the dihydronaphthalene or dihydronaphthalene-dicarboxy acids.

As indicated above, I have made this addition of sodium to naphthalene itself and to other polycyclic aromatic hydrocarbons. I have found that in the case of naphthalene itself, the product formed is in large part the 1:4 disodium compound. Formation of this compound is probably permitted by the splitting of the double bonds between the 1:2 and 3:4 positions and the formation of a double bond between the 2:3 positions with the sodium occupying the free linkages thus created. Such a mechanism would permit addition in a similar manner in the case of substituted naphthalene where the 1:4 positions may be occupied by constituent groups since the reaction is not dependent on replacement of hydrogen or substituents by the sodium; there is no hydrogen evolved in the reaction of my invention as far as I have been able to discover.

I have discovered that this sodium naphthalene addition product is a very reactive material. Thus, as indicated above, hydrolysis can be made to take place to form dihydronaphthalene, or the addition product still in the ether solution can be treated with $CO_2$ and converted into sodium salts of dihydronaphthalene dicarboxylic acids, which can be isolated. The sodium addition products of the other polycyclic aromatic hydrocarbons react in a similar manner. The further reactions of these sodium addition products are not, however, claimed in this application, but are the subject matter of co-pending application Serial No. 638,524, filed October 19, 1932 and issued January 7, 1936 as U. S. Patent 2,027,000.

In carrying out these reactions, I have found it to be of importance to have the surfaces of the sodium clean. Thus the solvent must be purified of such materials as will react with sodium and tend to form insoluble coatings thereon, under the conditions to be used, and the sodium should be protected from contact with such reactive materials from the time it is mechanically subdivided. Extreme fineness of sodium is not required although the rate will be dependent, among other things, on the extent of sodium surface, and this affords one means of controlling the rate. The naphthalene need not be of extreme purity. Technical flake naphthalene works quite satisfactorily. The complete absence of all sulfur compounds is not essential as shown by the fact that dimethyl sulfide can be used as an inert diluent solvent in the effective reaction medium for the reaction of sodium with naphthalene. The presence of free $CO_2$ dissolved in the solvent is likely to interfere with the reaction of sodium with naphthalene starting because of coating the sodium.

On the other hand, when the reaction is well started, dry $CO_2$ can then be introduced and the carboxylation carried on simultaneously as long as care is taken that the rate is insufficient to destroy completely all the green color of the sodium naphthalene compound, which will continue to be formed by the reaction of additional sodium. In this way the preparation of the sodium salts of the dicarboxy acids can be carried out simultaneously in a single vessel. In order to insure complete freedom from metallic sodium in the product, however, it is better to filter the green solution of the sodium naphthalene away from the unreacted sodium and treat it with $CO_2$ in a separate vessel. This precipitates the sodium salts which can be filtered out and the solvent, together with unreacted naphthalene and a small amount of the sodium naphthalene compound returned to the first vessel. Such a process can be operated either as a batch process or continuously.

The allowable concentration of naphthalene or other polycyclic aromatic hydrocarbon is limited only by its solubility. The reaction temperature can vary from at least —80° C. to above the melting point of sodium, limited only by the stability of the combination of materials used and that of the product. The reactions in general are fast up to the solution of one gram atom of sodium per gram molecule of naphthalene in solution. In these reactions, both in the prior reaction with sodium and in the carboxylation, obviously pressures above atmospheric may be used if desired or necessary to confine the solvents at the temperatures found most optimum for the reaction.

The following examples are given by way of further illustration:

*Example I.*—100 cc. of dimethyl ethylene glycol ether at room temperature were placed in a flask and to this was added 19 gms. of flake naphthalene and then 5.6 gms. of clean, finely divided sodium. The reaction commenced immediately upon adding the sodium as was evidenced by the solution turning an intensely green color. This solution was agitated continuously for about fifteen minutes and then a slow stream of $CO_2$ was introduced while the agitation was continued; this stream of $CO_2$ was maintained at such rate that the green color of the solution was not completely discharged until the sodium had essentially all dissolved or reacted. Toward the end of two hours, the carboxylation was allowed to go to completion; the green color was completely discharged and in the vessel was a white slurry of sodium salts of dihydronaphthalene-dicarboxylic acids. On treatment of the salts with aqueous HCl and repeated extraction with ether, a high yield of a mixture of the isomeric dibasic acids was isolated. The reactions are presumed to be essentially quantitative although a portion of the acid is difficult to extract from water. It is found that a considerable portion of the isomeric acids was the 1:4 acid. If carboxylation is carried out at low temperatures, —60° C. to —80° C., higher yields of the 1:4 acid have been obtained. Other crystallizable acids are obtained in varying amounts, amongst which the 1:2 acid has been found to a considerable amount.

*Example II.*—A solution of 128 gms. of naphthalene in approximately 900 cc. of purified diethyl ethylene glycol ether was agitated in contact with 46 grams of sodium in the form of chips, the solution being kept under a nitrogen atmosphere. The mixture was maintained at 24–26° C. and samples of the solution withdrawn at intervals for titrations of their sodium content; the sodium content of the solution is indicative of the extent of the reaction since the sodium is insoluble in the reactants. This was determined by first adding excess methanol to the sample to react with the addition compound and then titrating with standard acid. The results showed the presence of 5.2 gms. sodium per liter at the end of one hour, 18.2 gms. at the end of two-and-one-half hours, and 21.7 gms. at the end of twenty-four hours. The rate in either case can be varied by such factors as the extent of sodium surface, but it becomes almost negligible when one gram atom of sodium has dissolved for each molecule of naphthalene in solution.

*Example III.*—11.6 gms. sodium and 39 gms. naphthalene were added to 375 cc. glycol formal. The reaction started immediately. After fifteen minutes agitation, treatment with $CO_2$ was begun as in Example I, and completed in two hours.

*Example IV.*—In order to demonstrate the ease of reaction of alkali metals with naphthalene in a wide variety of polyether solvents a large number of experiments were carried out in a qualitative manner. A solution of naphthalene in the ether was treated with the alkali metal preferably though not necessarily in contact with nitrogen instead of air, and the metal surface scraped under the solution if necessary to start reation. The formation of the characteristic colored compound in solution took place readily at ordinary temperature. Ethers tested in this manner for bringing about the reaction of sodium with naphthalene included the following: methylal; ethylene glycol diethers such as the methyl methyl, methyl ethyl, ethyl ethyl, methyl butyl, ethyl butyl, butyl butyl, butyl lauryl; trimethylene glycol dimethyl ether; glycerol trimethyl ether; glycerol dimethyl ethyl ether; methyl ortho formate; ethyl ortho formate; diethylene glycol methyl ethyl ether; formal of the monomethyl ether of ethylene glycol; cyclic ethers such as dioxane, glycol formal, methyl glycerol formal; dimethylene pentaerythrite.

In a similar manner potassium was shown to react readily with naphthalene in dimethyl glycol ether. Lithium was shown to react readily with naphthalene in the same solvent.

*Example V.*—Using dimethyl glycol ether as solvent, sodium was reacted with diphenyl, phenanthrene, acenaphthene, anthracene, and retene. In each case the reaction occurred readily, and the hydrocarbon was substantially completely converted to the sodium addition compound within from a few minutes to one hour.

I claim:

1. A method of effecting the addition of an alkali metal to a polycyclic aromatic hydrocarbon which will form addition compounds therewith comprising reacting the alkali metal and the hydrocarbon in a reaction medium comprising a polyether derived from an aliphatic polyhydric alcohol having all the hydroxyl hydrogen atoms replaced by alkyl groups, which ether is substantially inert to both the reagents and the products under the conditions of the reaction and is present in sufficient amount to promote the reaction.

2. A method of effecting the addition of an alkali metal to a polycyclic aromatic hydrocarbon which will form addition compounds therewith which comprises reacting the alkali metal and the hydrocarbon in a reaction medium comprising a glycol diether in an amount sufficient to promote the reaction.

3. A method of effecting the addition of an alkali metal to a polycyclic aromatic hydrocarbon which will form addition compounds therewith which comprises reacting the alkali metal and the hydrocarbon in a reaction medium comprising a diether of a glycol having the ether groups on adjacent carbon atoms in an amount sufficient to promote the reaction.

4. A method of effecting the addition of an alkali metal to a polycyclic aromatic hydrocarbon which will form addition compounds therewith which comprises reacting the alkali metal and the hydrocarbon in a reaction medium comprising a polyether derived from an aliphatic, trihydric alcohol having all the hydroxyl hydrogen atoms replaced by alkyl groups, which ether is substantially inert both to the reagents and the products under the condition of the reaction and is present in an amount sufficient to promote the reaction.

5. A method of effecting the addition of an alkali metal to a polycyclic aromatic hydrocarbon which will form addition compounds therewith which comprises reacting the alkali metal and the hydrocarbon in a reaction medium comprising a glycerol triether in an amount sufficient to promote the reaction.

6. A method of effecting the addition of an alkali metal to an aromatic hydrocarbon of the group consisting of dinaphthyl, diphenyl, naphthalene, phenanthrene, anthracene, acenaphthene, and retene which comprises reacting the alkali metal and the hydrocarbon in a reaction medium comprising an ethylene glycol diether in an amount sufficient to promote the reaction.

7. A method of effecting the addition of sodium to diphenyl which comprises reacting the sodium and the diphenyl in a reaction medium comprising a polyether derived from an aliphatic, polyhydric alcohol having all the hydroxyl hydrogen atoms replaced by alkyl groups, which ether is inert both to the reagents and the products under the conditions of the reaction in an amount sufficient to promote the reaction.

8. A method of effecting the addition of sodium to a polycyclic aromatic hydrocarbon which will form addition compounds therewith which comprises reacting the sodium and the hydrocarbon in a reaction medium comprising an ethylene glycol diether in an amount sufficient to promote the reaction.

9. A method of effecting the addition of sodium to a polycyclic aromatic hydrocarbon which will form addition compounds therewith which comprises reacting the sodium and the hydrocarbon in a reaction medium containing, in an amount sufficient to promote the reaction, an ethylene glycol diether selected from the group which consists of the methyl methyl ether, the methyl ethyl ether, the ethyl ethyl ether, the methyl butyl ether, the ethyl butyl ether, the butyl butyl ether, and the butyl lauryl ether.

10. A method of effecting the addition of sodium to diphenyl which comprises reacting the sodium and diphenyl in a reaction medium comprising an amount of ethylene glycol diethyl ether sufficient to promote the reaction.

11. A method of electing the addition of sodium to diphenyl which comprises reacting the sodium and diphenyl in a reaction medium comprising an amount of ethylene glycol methyl ethyl ether sufficient to promote the reaction.

12. A method of effecting the addition of sodium to a polycyclic aromatic hydrocarbon which will form addition compounds therewith which comprises reacting the sodium and the hydrocarbon in a reaction medium which comprises a fully alkylated polyhydric alcohol which is inert both to the reagents and the products under the conditions of the reaction and is present in sufficient amount to promote the reaction.

NORMAN D. SCOTT.